OR 3,923,371

United Sta
Dalgleish

[11] 3,923,371
[45] Dec. 2, 1975

[54] OPTICAL FIBRE CONNECTORS
[75] Inventor: Jack Frank Dalgleish, Ottawa, Canada
[73] Assignee: Northern Electric Company Limited, Montreal, Canada
[22] Filed: Mar. 22, 1974
[21] Appl. No.: 453,593

[52] U.S. Cl. .............................................. 350/96 C
[51] Int. Cl.² ........................................... G02B 5/14
[58] Field of Search.. 350/96 R, 96 B, 96 C, 96 WG

[56] References Cited
UNITED STATES PATENTS
| | | | |
|---|---|---|---|
| 3,734,594 | 5/1973 | Trambarulo | 350/96 B |
| 3,810,802 | 5/1974 | Buhite et al. | 350/96 C X |
| 3,846,010 | 11/1974 | Love et al. | 350/96 C X |
| 3,861,781 | 1/1975 | Hasegawa et al. | 350/96 C |

OTHER PUBLICATIONS
Parfitt et al., Article in *Electronic Components*, Jan. 28, 1972, pp. 69 and 73-75.

Primary Examiner—David H. Rubin
Attorney, Agent, or Firm—Sidney T. Jelly

[57] ABSTRACT

Optical fibres are joined in end to end relationship by inserting the fibre ends into locating members having conically inclined convergent surfaces. A first fibre is fed into a holding member, which preferably has a first convergent surface, to a predetermined axial position. A second fibre is then inserted into the holding member, a second convergent surface guiding the end of the second fibre into axially aligned and abutting relationship. A plurality of pairs of fibres may also be connected, as for connecting optical fibre cables.

3 Claims, 10 Drawing Figures

OPTICAL FIBRE CONNECTORS

This invention relates to optical fibre connectors and is particularly concerned with mechanical connectors.

Optical fibres have considerable potential in communication systems, whether such systems are for transmission of speech; data; information such as photographs; television programs; or just light. In most instances it is necessary to couple fibres end to end such as when joining fibre lengths, to to couple fibres to devices such as detectors, amplifiers and similar. To provide convenient coupling of devices into a system the device can be provided with a short length of fibre extending from one end, or both ends. Coupling is then obtained by butt joining fibre to fibre.

Such joints are a source of loss. It is necessary to obtain as good alignment as possible and to provide good transfer from one fibre to another, either by good direct contact between the fibre core, or by some intervening fluid. The present invention provides for the butting of fibres by means of mechanical devices which hold the fibres in such a manner that assembly brings and holds the fibres in good alignment.

An optical fibre may comprise a core and a cladding surrounding the core which gives a step change in refractive index. Both core and cladding may be of glass. Such a fibre operates on the principle of total internal reflection at the core/cladding interface. An alternative form of fibre is of a material, for example glass, which has a continuously variable index of refraction. Both forms of fibre may be coated -possibly with a plastics material- to improve handling characteristics.

Essentially, a first fibre is coupled to a second fibre by inserting the first fibre into a holding member, with a length of the fibre extending uncovered. The holding member is then brought into registration with the second fibre. A part which includes a funnel shaped or conically inclined convergent surface guides the end of the second fibre into contact or near contact abutting relationship with the first fibre. A connector comprises at least one member, the member includes the part having a funnel shaped or conically inclined convergent surface. The convergent surface may be part of the holding member or may be formed on a separate member inserted in the holding member. A convergent surface may be provided for each fibre. A plurality of convergent surfaces may be provided to permit connection of a plurality of fibres, for example by joining a cable having several fibres.

The invention will be readily understood by the following description of certain embodiments, by way of example in conjunction with the accompanying diagrammatic drawings, in which.

Figure 1:
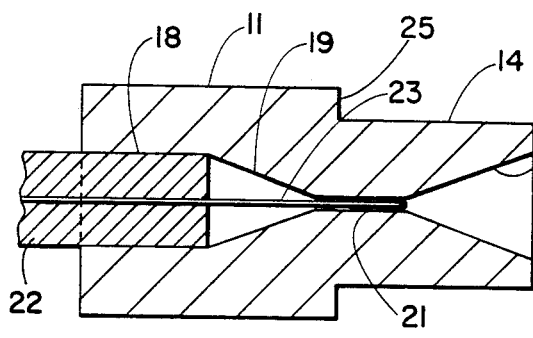
FIGS. 1 and 2 are cross-sections through the two members of a connector, before coupling together.
Figure 2:
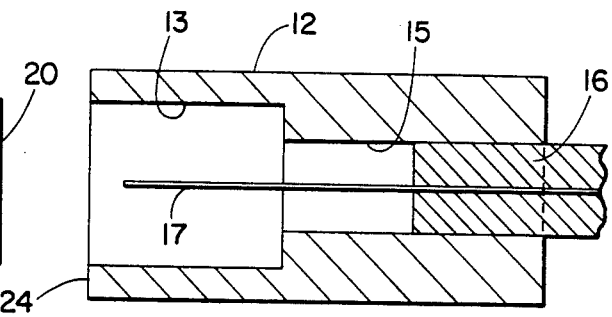
Figure 3:
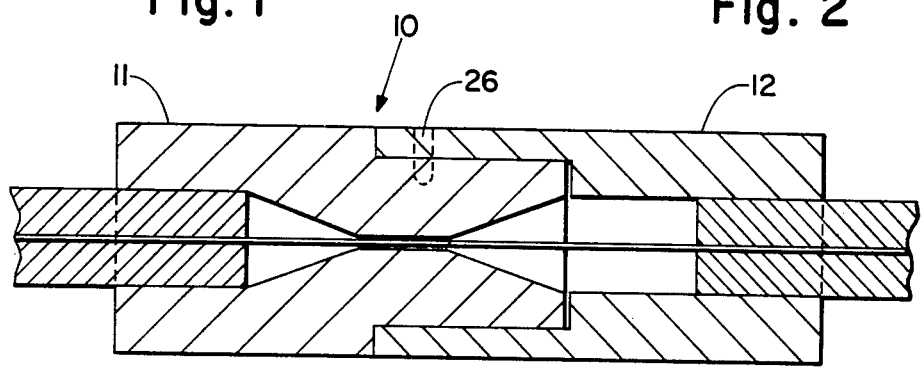
FIG. 3 is a cross-section through the assembled connector of FIGS. 1 and 2.

FIGS. 1, 2 and 3 illustrate a connector, indicated at 10, comprising a housing having two main members 11 and 12, which are holding members. Holding member 12 has a recess 13 which is of a size and shape to accept a boss 14 on holding member 11. The boss 14 is a good fit in the recess 13. Holding member 12 also has an axial bore 15 in which fits a coated fibre 16. The fibre has the plastic coating removed for a short length, the uncoated fibre 17 extending into the recess 13.

Holding member 11 has a bore 18 extending axially for part of its length, the bore 18 extending from the end remote from the boss 14. The inner end of the bore 18 is given a conical shape 19. A similar conical shaped recess 20 extends from the end of the holding member 11 forming the boss 14. The two conical recesses or shapes 19 and 20 have their apices spaced a short distance apart and are connected by a short axial bore 21. Axial bore 21 is a close fit on the fibre. A coated fibre 22 is held in the bore 18, the fibre 23 extending through and guided by conical shape 19 and into the axial bore 21. The fibre extends approximately half way through bore 21. In the example, the fibres 17 and 21 are assumed to comprise an inner core and a surrounding cladding. In the event that fibres having a continuously variable refractive index are used the fibres 17 and 21 will constitute a single item in the form of a fibre having a variable index of refraction, as previously described.

On assembly of the connector 10, by insertion of boss 14 into recess 13 the fibre 17 is guided into the axial bore 21 by the convergent surface of the conical shape or recess 20. When the coated fibres 16 and 22 are inserted into their respective holding members 12 and 11 the ends of the fibres 17 and 23 are preset relative to the holding member so that when the end surface 23 of the holding member 12 contacts surface 24 on holding member 11, the two fibres 17 and 23 are in abutting or substantially butting relationship. If desired a drop of suitable fluid may be inserted into the axial bore 21 before or after fibre 17 is inserted, to improve the coupling between the fibres. The holding members 11 and 12 may be held together by any suitable means, for example a pin indicated by dotted line 26.

Figure 4:
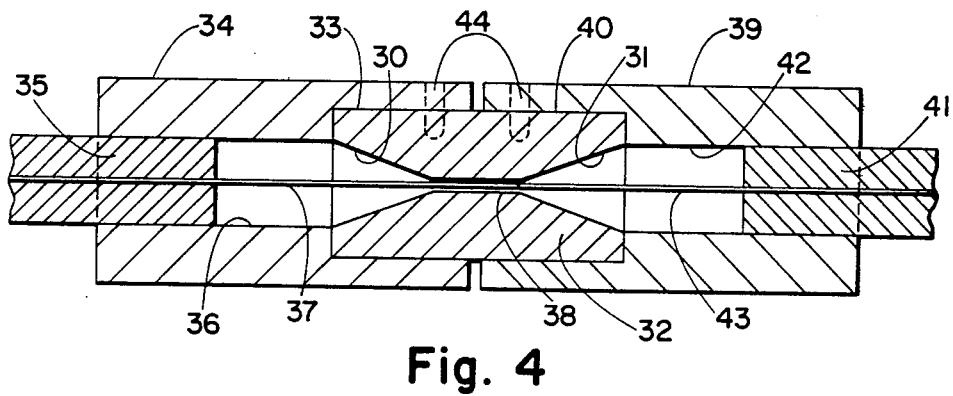
FIG. 4 is a cross-section, similar to that of FIG. 3, illustrating an alternative form.

FIG. 4 illustrates an alternative form in which convergent surfaces are formed by conical recesses 30 and 31 formed in each end of a central member 32. The central member is inserted in a recess 33 in the end of one holding member 34 and a coated fibre 35 inserted into an axial bore 36. The uncoated portion 37 of the fibre 35 extends partway into an axial bore 38 in the central member and connecting the apices of the conical recesses 30 and 31. The portion 37 is guided into the axial bore 38 by the convergent surface of the concial recess 30. A second holding member 39 has a recess 40 similar to recess 33 and fits on the central member 32. A further coated fibre 41 is inserted in an axial bore 42; with the uncoated portion 43 extending into the recess 40. As the holding member 39 is engaged with the central member 32 and pushed toward holding member 34, the convergent surface of the conical recess 31 guides the portion 43 into the axial bore 38. Holding members 34 and 39 and central member 32 form a housing.

The depths of the recesses 33 and 40 and the length of the central member 32 are such that when the ends of the central member 32 are in contact with the ends of the recesses the ends of the portions 37 and 43 are in butting or substantially butting relationship. A drop of suitable fluid may be inserted into the axial bore 38 before the uncoated portions are inserted, to ensure good coupling. The holding members 34 and 39 can be retained in position on the central member 32 by any suitable means, for example by pins as indicated by dotted lines 44.

Figure 5:
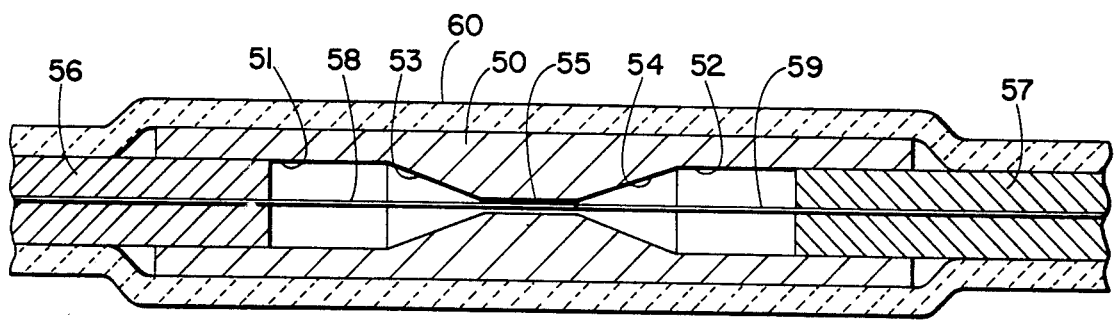
FIG. 5 is a cross-section of a further alternative form.
Figure 6:
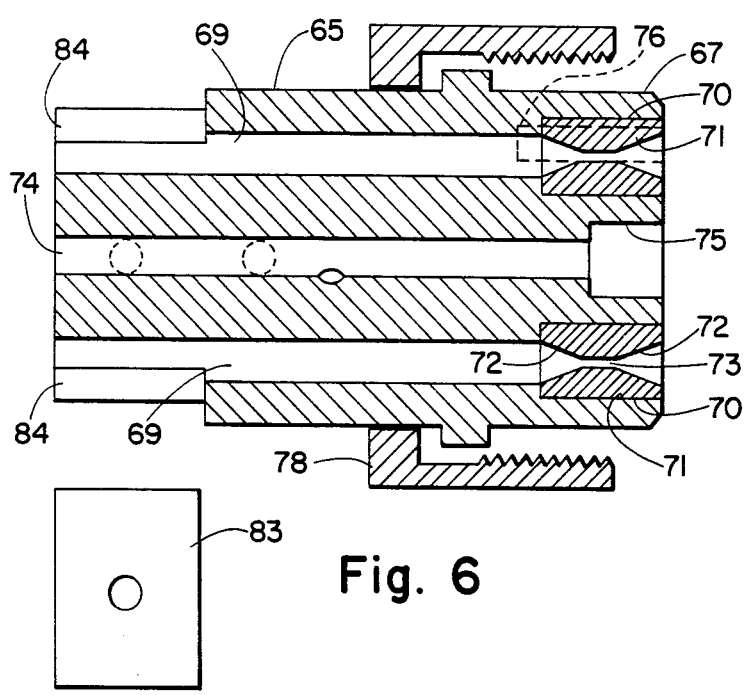
FIGS. 6, 7, 8 and 9 illustrate the parts of a connector for coupling a plurality of fibres, FIG. 6 a cross-section on the line VI—VI of FIG. 7 and FIG. 8 a cross-section on the line VIII—VIII of FIG. 9.
Figure 7:
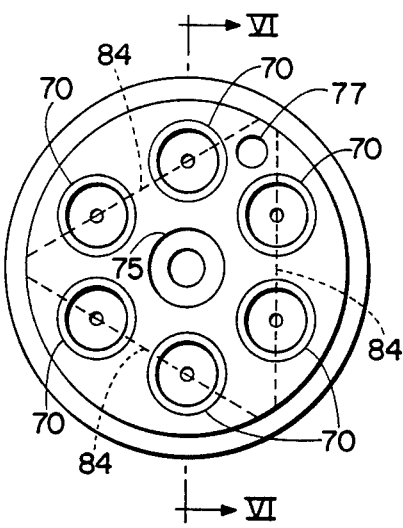
Figure 8:
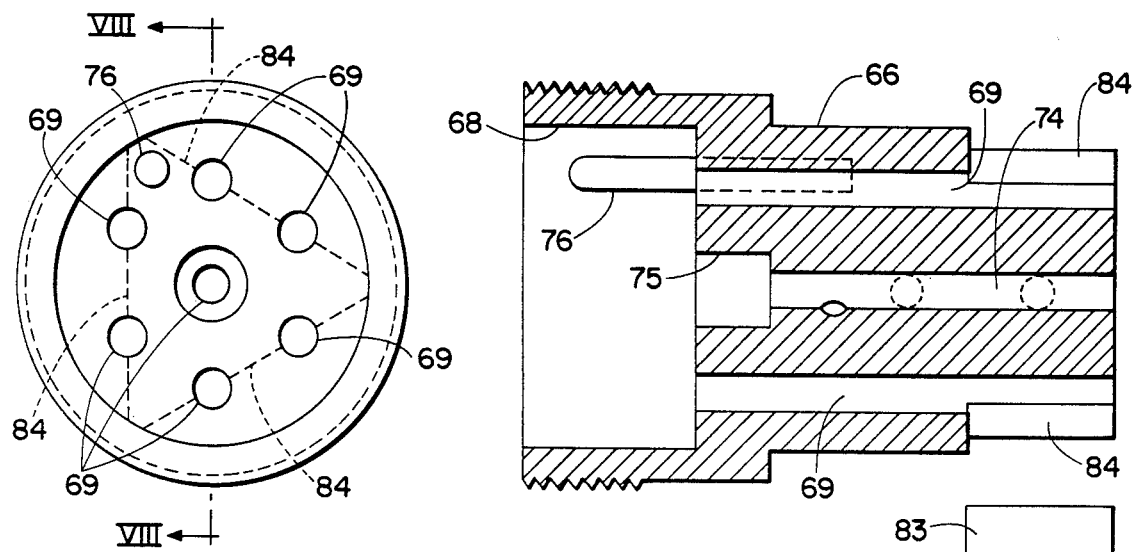
Figure 9:
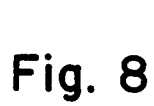

FIG. 5 illustrates an arrangement in which a housing in the form of a single holding member 50 is provided. The member 50 has axial bores 51 and 52 extending in from each end, the bores 51 and 52 ending in conical recesses 53 and 54. The apices of the conical recesses are joined by an axial bore 55. Coated fibres 56 and 57 are positioned in the bores 51 and 52, uncoated portions 58 and 59 extending through the conical recesses into the axial bore 55. As the fibres 56 and 57 are inserted in the bores 51 and 52 the portions 58 and 59 are guided by the convergent surfaces of the conical shapes or recesses 53 and 54 into the axial bore 55. The whole assembly is then encapsulated, as by applying a sheathing of heat shrinkable plastic tube 60, using an epoxy resin, or by other methods.

Figure 10:
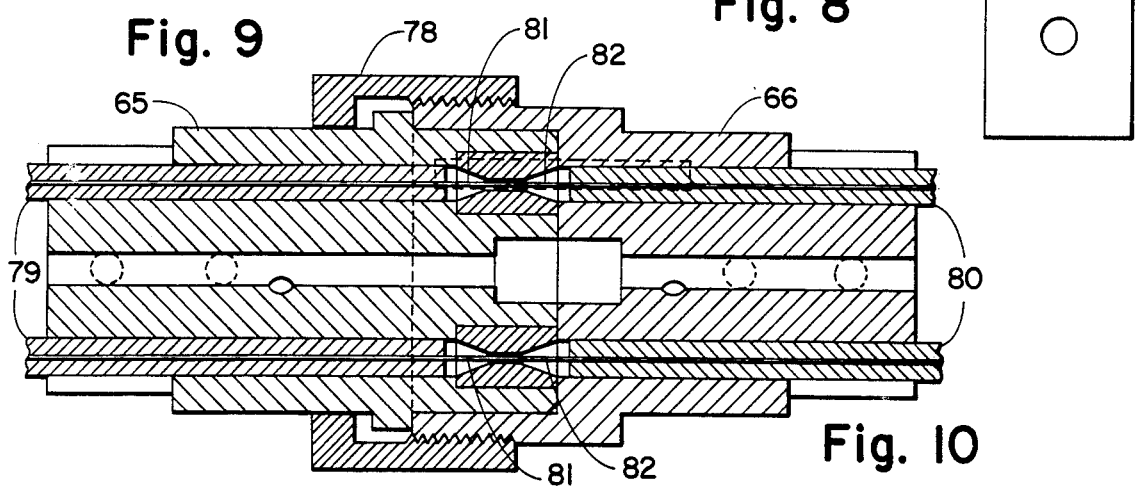
FIG. 10 is a cross-section through an assembled connector as in FIGS. 6, 7, 8 and 9.

FIGS. 6, 7, 8, 9 and 10 illustrate a connector for coupling a plurality of pairs of fibres, in the particular example six. The connector has a housing which comprises two holding members 65 and 66. Member 65 has a boss 67 at one end which fits into a recess 68 in one end of member 66. Each holding member has a plurality of holes 69 extending therethrough. In the member 65, the holes 69 have enlarged portions 70 at their ends situated in the boss 67. A locating and coupling member 71 is positioned in each of the portions 70. Each locating and coupling member 71 has two conical recesses 72, one extending in from each end. The apices of the recesses 72 are connected by an axial bore 73 which is a close fit on the outside diameter of the uncoated fibre. It is likely that a reinforcing wire may extend through a fibre cable and this wire will be terminated at the connector. Each holding member 65 and 66 has a central bore or hole 74 each having a short recess 75 at their ends as shown. The reinforcing wires are terminated in these recesses 75. An alignment pin 76 is also provided in holding member 66 with a corresponding hole 77 in holding member 65. A retaining nut 78 holds the two members 65 and 66 together. 84 on FIG. 10 illustrates the connector assembled and with fibres 79 positioned in the holding member 65 and fibres 80 in holding member 66. Short uncoated portions 81 and 82 extend from each fibre 79 and 80. As the fibres are inserted in holding members 65, the portions 81 are guided into the axial bores 73 by the convergent surfaces of the conical recesses 72. Similarly as the connector is assembled by pushing the two holding members together, the portions 82 are guided into the axial bores 73 by the convergent surfaces of the conical recesses 72. The fibres are held in the holding members, for example, by clamping plates which are fastened in position on three flat surfaces on each holding member. Thus in FIG. 6 one clamping plate 83 is shown removed, the flat surfaces on holding member 65 being indicated at 84 in FIGS. 6 and 7. Similarly clamping plates 83 are attached to flat surfaces 84 holding member 66.

While the examples so far described have had completely enclosed conical recesses for guiding the fibres into alignment, this is not essential. Thus a slot having a tapered U or Vee shaped cross-section could be used.

As has been stated in relation to FIGS. 1, 2 and 3, the examples of the remaining figures also are assumed to show fibres having cores and cladding with an outer plastic coating. If the alternate fibres, having continuously variable refractive indices, are to be connected, modification will only be required in that there may be some variation in the outer diameter of the fibre, which is of variable refractive index, as previously described.

Connectors may be sealed, as by introducing a sealant into the connector, to exclude contaminants and to retain the index matching fluid, if used, in place. Other methods of sealing can be used, such as designing connectors for the inclusion of O-rings, gaskets, and the like.

Connectors, in accordance with the present invention, are reusable and fully interchangeable, in that mating parts of a connector can be separated and remade with other suitable mating parts. It is not necessary to maintain the two same components together at all times. The holding members serve to protect the fibres when a connector is undone.

What is claimed is:

1. A connector for releasably connecting a plurality of independent pairs of coated optical fibres, each fibre of a pair in accurate abutting end-to-end alignment with the other fibre of a pair, comprising:

a first housing;

a plurality of bores extending axially through said first housing, said bores each including a small diameter portion adjacent a forward end of said housing, said small diameter portion of a diameter to fit closely on an uncoated end of a fibre, the remaining portion of each bore of a larger diameter to receive a coated portion of the fibre;

a plurality of first convergent surfaces at said forward end of said housing, a convergent surface extending from the surface of said forward end to each of said small diameter portions of said bores;

a plurality of second convergent surfaces, a convergent surface extending from said larger diameter portion of each of said bores to the related small diameter portion of the bore;

a second housing;

a plurality of bores extending axially through said second housing, each bore of a uniform diameter to receive a coated fibre with an uncoated end extending from a forward end of said second housing;

cooperating formations in said first and second housings for aligning said housings in a predetermined relative position;

and retaining means on one of said housings in engagement with means on the other of said housing, for retaining said first and second housings in engagement with said forward end of said first housing in face to face abutting relationship with a forward end of said second housing and each bore in said first housing in axial alignment with a bore in said second housing, whereby the uncoated ends of the fibres extending from said second housing are guided by said first convergent surfaces in said first housing into abutting end-to-end alignment with the uncoated ends of the corresponding fibre of each pair located in the small diameter portion of the first housing bores.

2. A connector as claimed in claim 1, including an enlarged portion in each of said bores in said first housing, said enlarged portion at said forward end of said first housing;

and a plurality of coupling members, a coupling member in each of said enlarged portions, said small diameter portions of said bores and said first and second convergent surfaces being formed in said coupling members.

3. A connector as claimed in claim 1, including clamping members on each of said housings, said clamping members engaging with the coated portions of each fibre.

* * * * *